Nov. 6, 1951 W. B. ATKINSON 2,574,315
SELF-UNLOADING VEHICLE
Filed Jan. 27, 1950 3 Sheets-Sheet 1
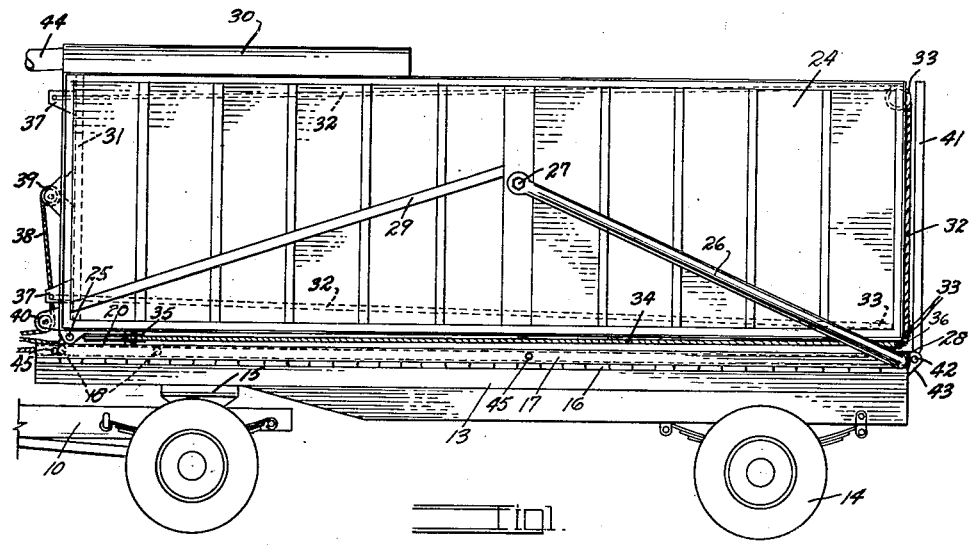
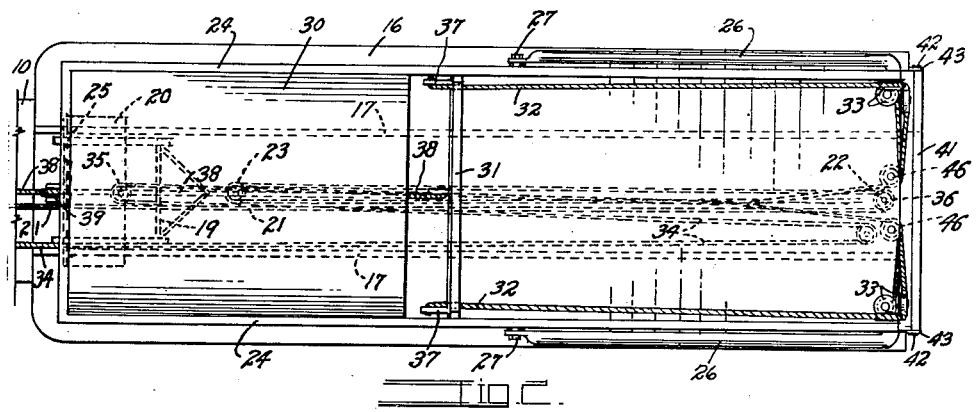
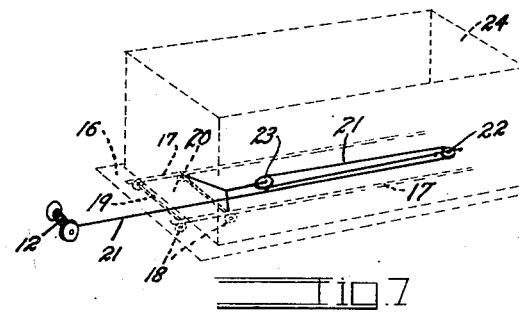
INVENTOR.
WILLIAM B. ATKINSON
BY
ATTORNEY

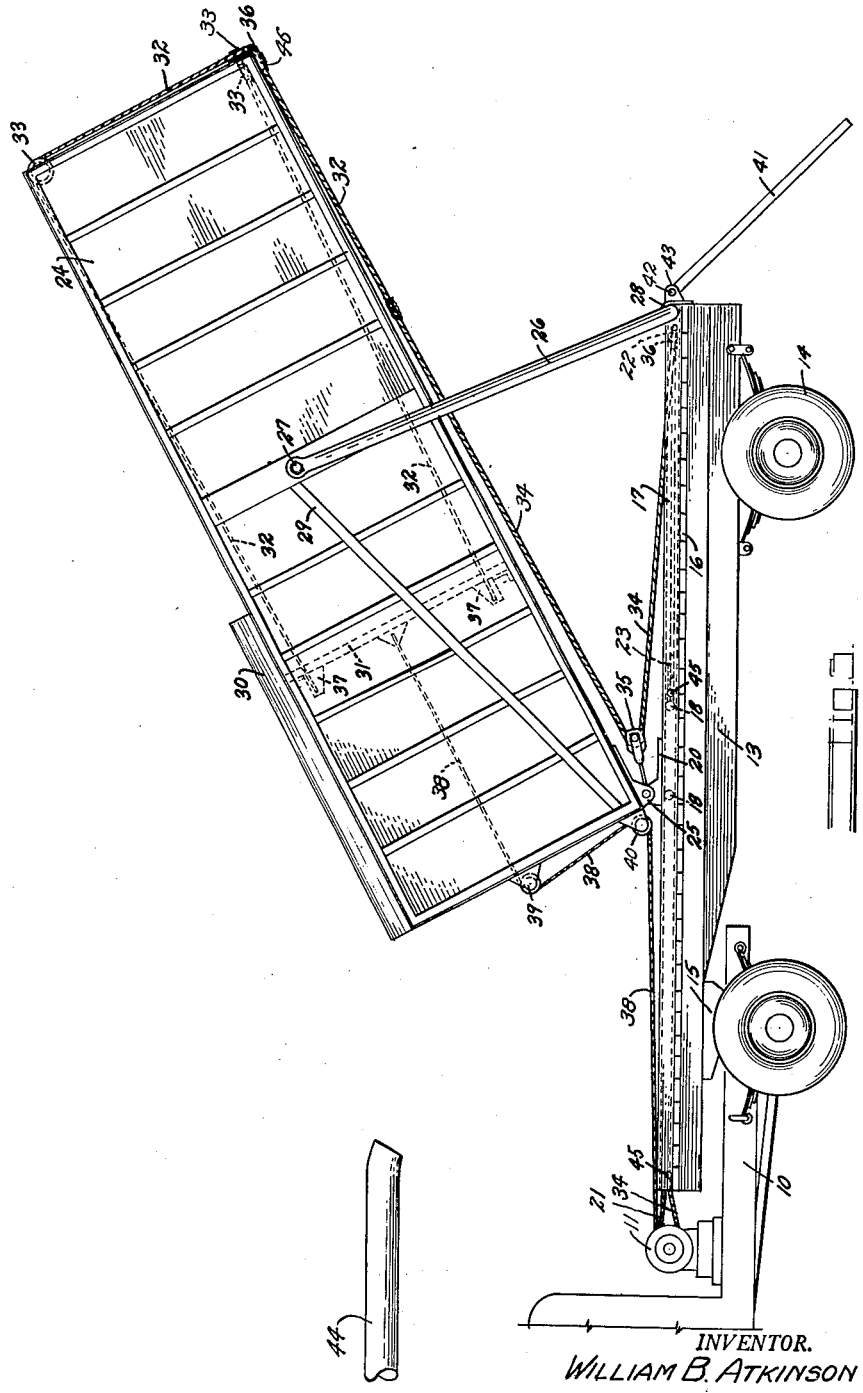

Nov. 6, 1951 W. B. ATKINSON 2,574,315
SELF-UNLOADING VEHICLE
Filed Jan. 27, 1950 3 Sheets-Sheet 3
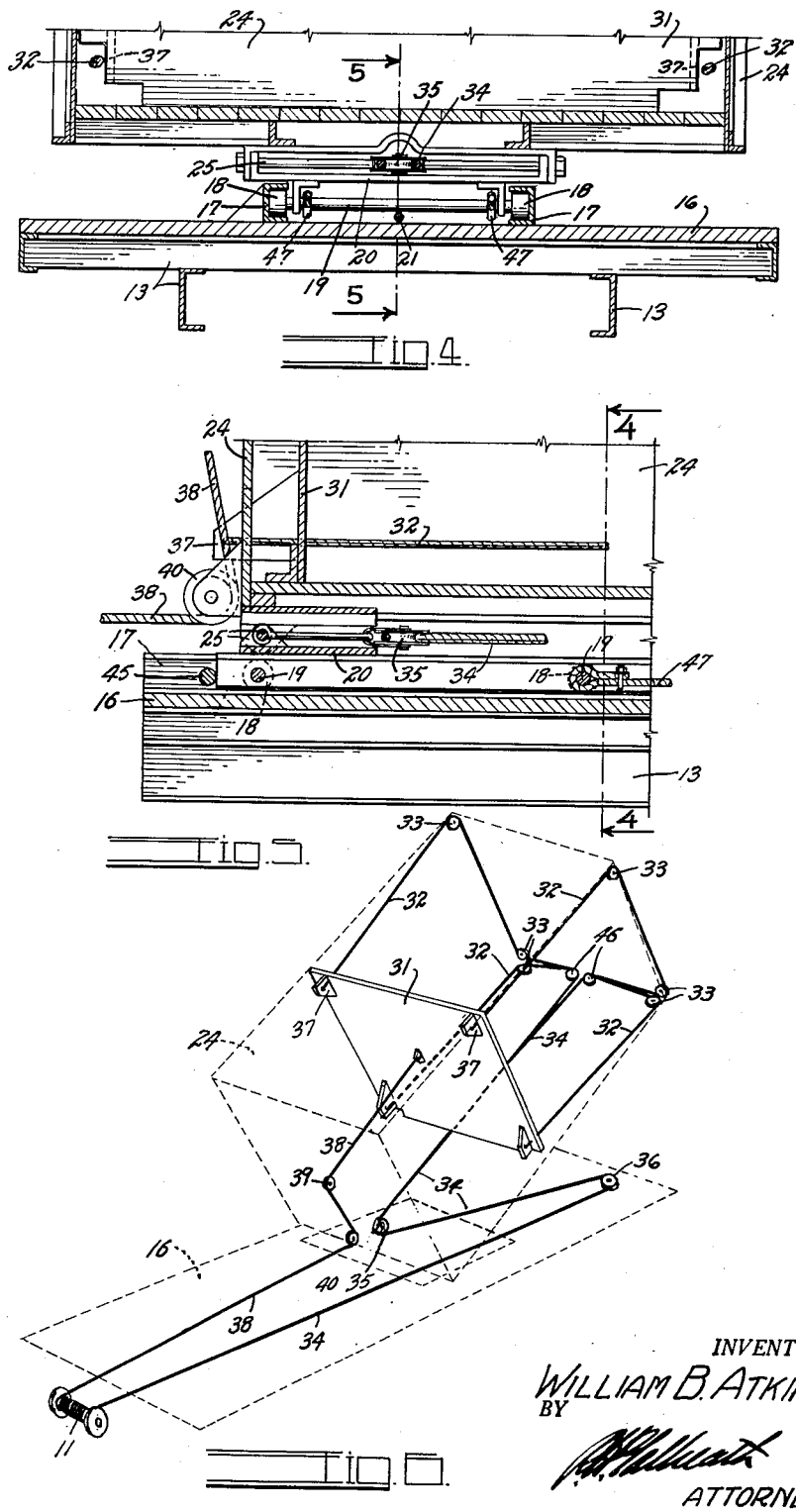
INVENTOR.
WILLIAM B. ATKINSON
BY
ATTORNEY Patented Nov. 6, 1951

2,574,315

UNITED STATES PATENT OFFICE 2,574,315

SELF-UNLOADING VEHICLE

William B. Atkinson, Colorado Springs, Colo.

Application January 27, 1950, Serial No. 140,898

3 Claims. (Cl. 214—82)

This invention relates to a self-unloading vehicle, and is more particularly designed for hauling and stacking hay. The principal object of the invention is to provide a portable vehicle for transporting hay which, when loaded, may be backed to the stacking position and elevated to discharge the entire load from a height suitable for stacking purposes.

Another object of the invention is to provide a vehicle with means whereby a load in the vehicle can be forced rearwardly to discharge from the rear extremity of the vehicle.

A still further object is to provide a vehicle body construction which will enable the rear extremity of the body to be elevated to a comparatively great height and to provide means whereby the load may be forced rearwardly and upwardly in the body to discharge from the elevated rear extremity thereof.

Other objects and advantages reside in the detail construction of the invention, which is designed for simplicity, economy, and efficiency. These will become more apparent from the following description.

In the following detailed description of the invention, reference is had to the accompanying drawings which forms a part hereof. Like numerals refer to like parts in all views of the drawings and throughout the description.

In the drawings:

Fig. 1 is a side view of the improved self-dumping vehicle body, illustrating it as a trailer mounted on a towing truck and in the lowered or transporting position;

Fig. 2 is a plan view thereof;

Fig. 3 is a side view, illustrating the body in the elevated dumping position;

Fig. 4 is a fragmentary, enlarged, detail cross-section, taken on the line 4—4, Fig. 1;

Fig. 5 is a similarly enlarged, fragmentary cross-section, taken on the line 5—5, Fig. 4;

Fig. 6 is a diagrammatic, perspective view, illustrating the relative positions of various operating cables employed in the improved self-dumping vehicle for forcing the load from the vehicle body; and Fig. 7 is a similar diagrammatic view, illustrating the relative positions of the cable used for elevating the body to the dumping position.

In the drawings, a conventional tow truck is indicated at 10 provided with power operated, cable winding winch drums 11 and 12 and with a standard fifth wheel for attachment to a trailer. The improved self-dumping vehicle is carried on a chassis frame 13 mounted at the back on rear wheels 14 and at the front upon the fifth wheel 15 of the tow truck 11.

The chassis frame 13 supports a floor 16. Two parallel, longitudinally extending, channel-shaped track rails 17 extend medially throughout the length of the floor 16. Rollers 18 are adapted to travel along the inside of the channels of the track rails 17. The rollers 18 are mounted on the extremities of dolly shafts 19 which support a traveling dolly plate 20. The rearward travel of the dolly plate is limited by means of a stop bar 45 extending between the track rails intermediate the length of the latter and against which the rollers engage. Upward or downward movement of the rollers is prevented by means of the channel shape of the tracks 17.

The dolly plate 20 may be drawn rearwardly on the floor 16 by means of a hoisting cable 21 which extends from the winch drum 12 rearwardly about a sheave wheel 22 positioned at the rear of the floor 16, thence forwardly to a second sheave wheel 23 connected to the dolly shafts 19, thence rearwardly to a fixed connection at the first sheave wheel 22. Thus, when the drum 12 is rotated to wind in the cable 21, the dolly plate 20 will be drawn rearwardly along the tracks 17 at a two-to-one ratio.

A box-like body 24 is mounted at its forward extremity, by means of a suitable hinge 25, upon the dolly plate 20 so that as the dolly plate moves rearwardly, the forward extremity of the body 24 will be moved rearwardly.

A U-shaped toggle frame 26 is pivotally connected at its two extremities to toggle bearing studs 27 extending oppositely outward from the mid-portions of the two sides of the body 24. The mid-portion of the U-shaped toggle frame 26 extends across the rear extremity of the vehicle chassis 13 below the body 24 where it is rotatably mounted in suitable bearing straps 28 secured to the chassis frame 13.

It can be seen that with the above construction the rear extremity of the body 24 will be swung upwardly by the toggle action of the frame 26 as the forward extremity of the body travels rearwardly along the track rails 17.

The body 24 is suitably braced by means of angle braces 29 to relieve the strain occasioned by the relatively great weight supported at the trunnion studs 27. The body is normally open at its rear and for a major portion of the length of its top. The forward portion of the top is covered by means of a roof 30 of canvas or other suitable material.

The body is rectangular in cross-section, and a rectangular, movable bulkhead 31 is mounted therein so that it may move longitudinally throughout the entire length of the body. The bulkhead 31 is drawn toward the rear extremity of the body by means of four corner cables 32, which extend from each corner of the bulkhead rearwardly over guide sheaves 33 at the rear corners thereof, thence forwardly beneath the bottom thereof, terminating in a single unloading cable 34.

The unloading cable 34 extends forwardly beneath the body 24 and about a rear sheave 36 mounted at the back of the floor 16. From the rear sheave 36 the cable 34 extends forwardly to the other winch drum 11. It can be readily seen that, regardless of the position of the body 24, rotation of the drum 11 will draw the bulkhead 31 toward the open rear extremity of the body.

The corner cables 32 extend through the bulkhead and are connected to forwardly extending brackets 37 thereon, which allow the bulkhead to move rearward beyond the rear guide sheaves 33 so as to completely discharge the load therefrom.

The bulkhead may be pulled forwardly in the body by means of a return cable 38 extending from the middle of the forward face of the bulkhead over a central front guide pulley 39 on the front extremity of the body, thence downwardly beneath a second guide pulley 40 and forwardly to a winch drum.

Should the tow truck have but two winch drums, as indicated at 11 and 12, the return cable 38 may be passed around the drum 11 in the opposite direction to the unloading cable 34, since these cables always move in the opposite directions and at the same speed. In fact, the cable 38 could be continuous with the cable 34 and be wound about the drum 11 intermediate the cable extremities.

When the body 24 is in the lowered position of Fig. 1, the open rear extremity may be closed by means of a hinged end gate 41 which is hingedly supported from a hinge shaft 42 carried in brackets 43 extending across the rearward extremity of the chassis 13.

The body may be loaded in any desired manner. One method of loading hay into the body is to blow the hay through a blower discharge pipe 44 into the forward extremity of the body. The roof 30 prevents the hay from scattering while under the influence of the air from the blower pipe 44.

When the body has been completely filled, the tow truck is driven to the stacking position and backed to the stack. The end gate 41 is now lowered and the drum 12 is actuated to tighten the cable 21 and draw the forward extremity of the body rearwardly, causing the rear extremity thereof to move upwardly and rearwardly over the stacking position, as shown in Fig. 3.

When the body has reached its fully elevated position, the dolly rollers 18 will engage the stop bar 45 to prevent further rearward movement of the dolly. The drum 12 is now locked and the drum 11 is energized to reel in the unloading cable 34. This pulls the bulkhead 31 rearwardly and upwardly in the body 24 so as to push the entire load of hay therefrom. The hay falls from the elevated rear extremity of the body to form a relatively high pile or stack.

The end gate 41 serves several purposes: first, it prevents loss of the load during transportation; second, it prevents hay from piling beneath the vehicle during the stacking operation; and third, it serves as a ramp so that machinery and other equipment may be driven into the body for transportation between jobs. The end gate 41 may be supported in the elevated, closed position by means of any suitable fastening devices.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A self-unloading vehicle comprising: a vehicle chassis; longitudinally extending tracks on said chassis; a traveling dolly arranged to travel along said tracks; a body hingedly mounted on said dolly at the forward extremity of the former; a toggle arm extending rearwardly from the mid-portion of each side of said body to a hinged connection with the rear extremity of said chassis so that as said dolly moves rearwardly, said rear extremity will be swung upwardly; a winding drum; a flexible member extending from said dolly to said winding drum for actuating said dolly rearwardly; a movable bulkhead in said body; and means for moving said bulkhead rearwardly to force a load from said body.

2. A self-unloading vehicle comprising: a vehicle chassis; longitudinally extending tracks on said chassis; a traveling dolly arranged to travel along said tracks; a body hingedly mounted on said dolly at the forward extremity of the former; a toggle arm extending rearwardly from the mid-portion of each side of said body to a hinged connection with the rear extremity of said chassis so that as said dolly moves rearwardly, said rear extremity will be swung upwardly; a winding drum; a flexible member extending from said dolly to said winding drum for actuating said dolly rearwardly; a movable bulkhead in said body; and a second flexible member extending from said bulkhead to said winding drum whereby said bulkhead may be drawn rearwardly in said body for forcing the load rearwardly therein.

3. A self-unloading vehicle comprising: a vehicle chassis; longitudinally extending tracks on said chassis; a traveling dolly arranged to travel along said tracks; a body hingedly mounted on said dolly at the forward extremity of the former; a toggle arm extending rearwardly from the mid-portion of each side of said body to a hinged connection with the rear extremity of said chassis so that as said dolly moves rearwardly, said rear extremity will be swung upwardly; a winding drum; a flexible member extending from said dolly to said winding drum for actuating said dolly rearwardly; and an end gate hingedly mounted on the rear extremity of said chassis and adapted to swing upwardly to close the rear extremity of said body when said body is in the horizontal position on said chassis.

WILLIAM B. ATKINSON.

REFERENCES CITED

The following references are of record in the file of this patent:

UNITED STATES PATENTS

| Number | Name | Date |
|---|---|---|
| 1,485,632 | Shea | Mar. 4, 1924 |
| 2,123,505 | Faries | July 12, 1938 |
| 2,298,982 | Smith | Oct. 13, 1942 |
| 2,463,987 | Malone et al. | Mar. 8, 1949 |
| 2,504,467 | Thetford | Apr. 18, 1950 |
| 2,523,916 | Paiement | Sept. 26, 1950 |